Patented Feb. 14, 1928.

1,659,382

UNITED STATES PATENT OFFICE.

HUGH STOTT TAYLOR, OF PRINCETON, NEW JERSEY, ASSIGNOR TO E. I. DU PONT DE NEMOURS & COMPANY, OF WILMINGTON, DELAWARE, A CORPORATION OF DELAWARE.

PROCESS OF MAKING HYDROGEN PEROXIDE.

No Drawing.   Application filed February 1, 1926.   Serial No. 85,375.

This invention relates to a process of producing hydrogen peroxide and comprises submitting a mixture of hydrogen and oxygen together with mercury vapor either alone or in the presence of liquid mercury to the action of the resonance radiation of mercury.

For example, if hydrogen and oxygen in substantially equal proportions be placed in a quartz vessel containing mercury vapor in the presence of liquid mercury and the system be exposed to the light from a cooled mercury arc, I have found that hydrogen peroxide is one of the products which results. The reaction proceeds rapidly even at room temperature or lower, and may be accelerated by increasing the working temperature.

Since continued exposure of the gaseous system to the resonance radiation will ultimately produce water, it is preferable to adopt a method of operation whereby the mixed gases containing mercury vapor are caused to flow continuously through a quartz system illuminated by the resonance radiation. In this manner the reaction may be confined entirely to the production of hydrogen peroxide without simultaneous production of water. The hydrogen peroxide produced by the reaction may be removed from the gas mixture in any suitable manner and the unchanged hydrogen and oxygen with the admixed mercury atoms may be again subjected to the influence of the resonance radiation by recirculation.

This invention differs fundamentally from a large number of other processes achieved photochemically in that the activating energy is not the whole region of ultra-violet light but a very special fraction thereof, namely, the so-called resonance radiation, occurring mainly at the centre of the mercury line situated at about a wave length of 2536.7 Angstrom units. Furthermore, this energy, having access to the reaction system through the quartz vessel or other suitable container for the reaction system, is absorbed not by the reacting constituents directly, but by mercury deliberately introduced for this purpose into the reaction system. The atoms of mercury absorbing such resonance radiation are converted to an energy-rich state, to so-called excited mercury atoms, and these excited atoms are capable of decomposing hydrogen molecules, by collision, probably into their atomic constituents. It is these atoms of hydrogen that are probably the active constituents of the reacting mixtures.

To facilitate the emission of resonance radiation from a mercury arc it is necessary to have in the arc system a low pressure of mercury vapor. Otherwise the activating resonance radiation does not leave the mercury arc vessel, but is absorbed by the mercury vapor in the arc system itself. It is for this reason that I have found it desirable to work with a cooled mercury arc. This may be accomplished in any convenient manner, such as by having the arc system burning in a stream of running cold water, the quartz reaction system being placed adjacent thereto either cooled or maintained at any desired temperature. There are, however, other methods of securing the emission of resonance radiation and other dispositions of the arc system and reaction system which may be devised without departing from the principle involved in the present invention.

I have further found that it is advantageous to operate these processes at pressures greater than a few millimeters of the reacting gases. In this way larger yields of useful products may be secured. By operation, for example, at atmospheric pressures, it is possible to secure quantities of useful products considerably in excess of those which would be formed at lower pressures. The increases in quantum of products formed may be due to the fact that by operating at pressures above about 5 centimeters of mercury, the frequency of molecular collision is increased to such an extent as to cause reaction to predominate over losses of energy by radiation. The upper limits of pressures which are feasible are dependent upon the operations taking place and the reactions desired.

I do not wish to place any restrictions of temperature, pressure, velocity of gas flow, composition of the gas mixture, concentration of mercury vapor or intensity of incident resonance radiation on the conduct of the process according to the present invention. These operating conditions may be varied within wide limits, dependent on the concentration of reaction product desired and the cost factors associated therewith.

A further advantage of this method of promoting this reaction is that the operations can be carried out in the presence of numerous foreign constituents. In this way the range of gaseous mixtures containing hydrogen and oxygen which may be submitted to the reaction process is considerably increased.

I claim:

1. The process of producing hydrogen peroxide which comprises subjecting a mixture of oxygen, hydrogen and mercury vapor to the resonance radiation of mercury.

2. The process of producing hydrogen peroxide which comprises subjecting a mixture of oxygen, hydrogen and mercury vapor to the radiation from a cooled mercury vapor arc.

3. The process of producing hydrogen peroxide which comprises subjecting a mixture of oxygen and hydrogen to mercury atoms excited by the resonance radiation of mercury.

4. The process of effecting a chemical combination between hydrogen and oxygen to produce hydrogen peroxide which comprises bringing oxygen into contact with hydrogen in the presence of mercury vapor whose atoms have been excited by the resonance radiation from a mercury vapor arc.

5. The process of producing hydrogen peroxide which comprises subjecting a mixture of oxygen with hydrogen and mercury vapor in the presence of liquid mercury, to the resonance radiation of mercury.

6. The process of producing hydrogen peroxide which comprises subjecting a mixture of oxygen with hydrogen and mercury vapor in the presence of liquid mercury, to the radiation from a cooled mercury vapor arc.

7. The process of producing hydrogen peroxide which comprises subjecting a mixture of oxygen with hydrogen in substantially equal proportions to mercury atoms excited by the resonance radiation of mercury.

8. The process of producing hydrogen peroxide which comprises subjecting a stream containing oxygen, hydrogen and mercury vapor, to the resonance radiation of mercury.

9. The process of producing hydrogen peroxide which comprises subjecting a stream containing oxygen, hydrogen and mercury vapor, to the radiation from a cooled mercury vapor arc.

10. The process of producing hydrogen peroxide which comprises making up a mixture of oxygen and hydrogen, passing the mixture through a reaction zone wherein it is exposed for a limited time to the action of mercury atoms excited by the resonance radiation of mercury, separating the hydrogen peroxide formed and recirculating any remaining oxygen-hydrogen mixture.

11. The process described in claim 8 in which the oxygen and hydrogen are present in substantially equal proportions.

In testimony whereof I affix my signature.

HUGH STOTT TAYLOR.